US010007795B1

(12) United States Patent
Chung et al.

(10) Patent No.: US 10,007,795 B1
(45) Date of Patent: Jun. 26, 2018

(54) DETECTION AND RECOVERY OF DOCUMENTS THAT HAVE BEEN COMPROMISED BY MALWARE

(71) Applicant: Trend Micro Incorporated, Tokyo (JP)

(72) Inventors: Chih-Ko Chung, New Taipei (TW); Pei-yin Wu, New Taipei (TW); Shuang-Fu Han, New Taipei (TW)

(73) Assignee: Trend Micro Incorporated, Tokyo (JP)

( * ) Notice: Subject to any disclaimer, the term of this patent is extended or adjusted under 35 U.S.C. 154(b) by 125 days.

(21) Appl. No.: 14/180,150

(22) Filed: Feb. 13, 2014

(51) Int. Cl.
   *G06F 21/62* (2013.01)
   *G06F 21/56* (2013.01)
   *G06F 21/64* (2013.01)
   *G06F 21/60* (2013.01)

(52) U.S. Cl.
   CPC ............ *G06F 21/62* (2013.01); *G06F 21/568* (2013.01); *G06F 21/60* (2013.01); *G06F 21/602* (2013.01); *G06F 21/645* (2013.01)

(58) Field of Classification Search
   CPC .................. G06F 21/60; G06F 21/602; G06F 21/62–21/645; G06F 11/1402; G06F 21/568
   See application file for complete search history.

(56) References Cited

U.S. PATENT DOCUMENTS

| | | | |
|---|---|---|---|
| 2005/0171983 A1* | 8/2005 | Deo | G06F 17/30067 |
| 2006/0184798 A1* | 8/2006 | Yaldwyn | G06F 21/10 713/180 |
| 2007/0168657 A1* | 7/2007 | Carro | G06F 21/645 713/156 |
| 2007/0250918 A1* | 10/2007 | Aboual Chamat | 726/5 |
| 2009/0164529 A1* | 6/2009 | McCain | G06F 11/1464 |
| 2009/0228533 A1* | 9/2009 | Reddy | G06F 11/1453 |
| 2009/0271586 A1* | 10/2009 | Shaath | 711/163 |
| 2013/0067576 A1* | 3/2013 | Niemela | 726/24 |

OTHER PUBLICATIONS

Ransomware, Trend Micro, 2 sheets [retrieved on Feb. 13, 2014], retrieved from the internet: http://about-threats.trendmicro.com/us/definition/ransomware/index.html.
Microsoft Malware Protection Center—Ransomware, 3 sheets [retrieved on Feb. 13, 2014], retrieved from the internet: http://www.microsoft.com/security/portal/mmpc/shared/ransomeware.aspx.
Parity bit—from Wikipedia, the free encyclopedia, 7 sheets, page last modified on Apr. 12, 2014, [retrieved on Apr. 15, 2014], retrieved from the internet: http://en.wikipedia.org/wiki/Parity_bit.

* cited by examiner

Primary Examiner — Mahfuzur Rahman
Assistant Examiner — Arya Golriz
(74) Attorney, Agent, or Firm — Okamoto & Benedicto LLP

(57) ABSTRACT

Documents that have been compromised by malware are detected and recovered. A hash of a portion of a file of a document is generated. An identifier of the file includes a signature that is embedded in the file, with the identifier including the hash of the portion of the file and other file information, such as a pathname of the file. A list that includes the identifier of the file is consulted before generating a backup copy of the file. The file is restored from the backup copy of the file in response to detecting that the file has been encrypted.

12 Claims, 13 Drawing Sheets

DETECTION AND RECOVERY OF DOCUMENTS THAT HAVE BEEN COMPROMISED BY MALWARE

BACKGROUND OF THE INVENTION

1. Field of the Invention

The present invention relates generally to computer security, and more particularly but not exclusively to methods and apparatus for detecting and recovering documents that have been compromised by malware.

2. Description of the Background Art

Malware, also known as "malicious code," may be used to compromise documents by encryption, obfuscation, corruption, or other ways of rendering the documents inaccessible or otherwise unusable to their owner. An example of such malware is the so called "ransomware," which holds documents hostage by encrypting the documents.

FIG. 1 schematically illustrates how a ransomware attack may be perpetrated by a cybercriminal. The cybercriminal may attach the ransomware in a spam email that is sent to a user's computer (see arrow 11). The user opens the spam email and its attachment (see arrow 12), thereby activating the ransomware to execute and encrypt documents stored in the user's computer (see arrow 13). The ransomware employs a strong encryption algorithm, e.g., Advanced Encryption Standard (AES) 256 algorithm, making it virtually impossible to decrypt the encrypted documents without the corresponding decryption key. The cybercriminal may send an email or the ransomware may display a message asking for "ransom money" to decrypt the encrypted documents (see arrow 14). The cybercriminal may also threaten to delete the encrypted documents if the ransom money is not paid within a limited time. When the user pays the ransom money, the cybercriminal allows the encrypted documents to be decrypted (see arrow 15), such as by providing the decryption key or instructing the ransomware to decrypt the encrypted documents.

SUMMARY

In one embodiment, documents that have been compromised by malware are detected and recovered. A hash of a portion of a file of a document is generated. An identifier of the file includes a signature that is embedded in the file, with the identifier including the hash of the portion of the file and other file information, such as a pathname of the file. A list that includes the identifier of the file is consulted before generating a backup copy of the file. The file is restored from the backup copy of the file in response to detecting that the file has been encrypted.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 2:
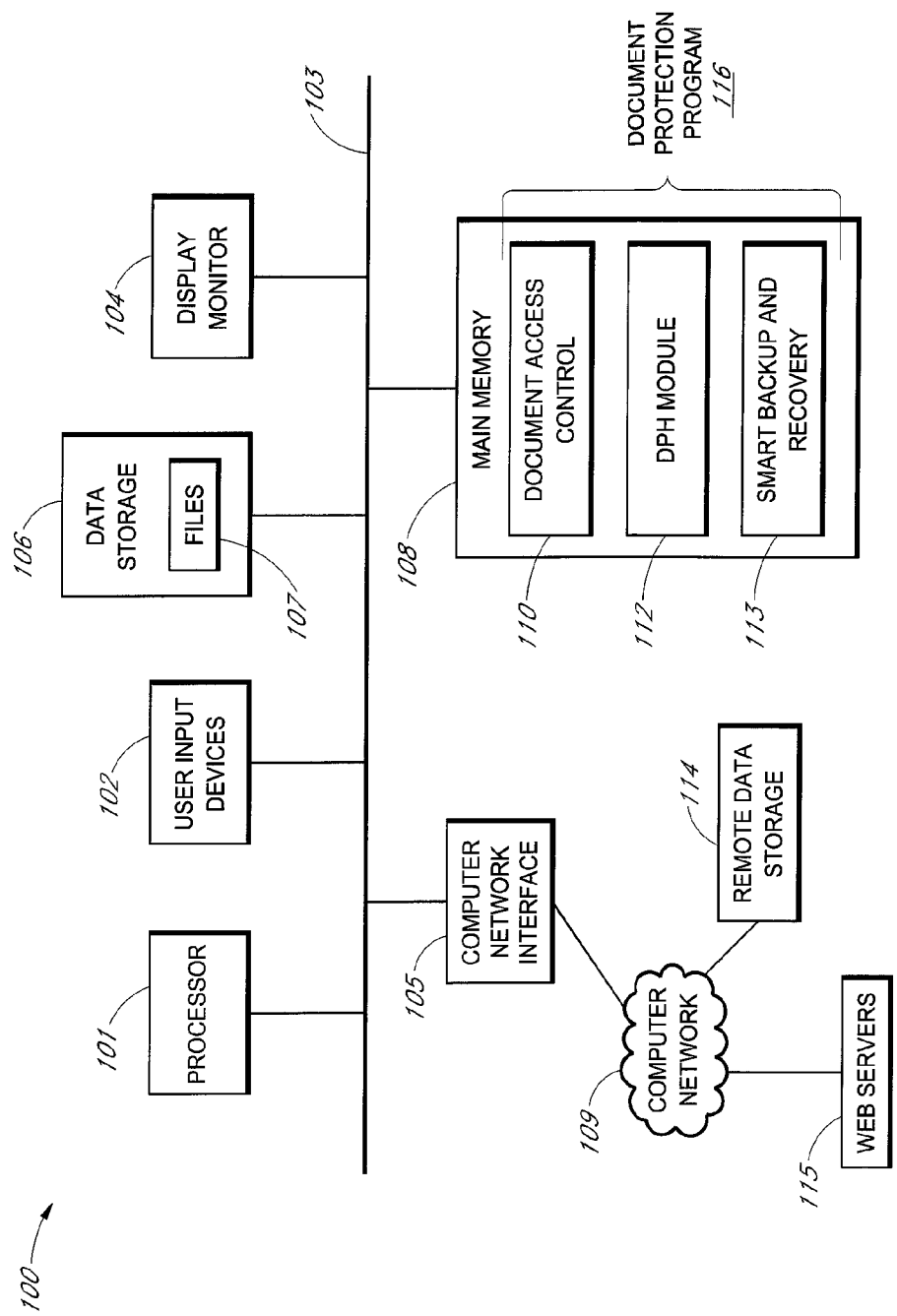
FIG. 2 shows a schematic diagram of a computer in accordance with an embodiment of the present invention.

Referring now to FIG. 2, there is shown a schematic diagram of a computer 100 in accordance with an embodiment of the present invention. The computer 100 may be part of a system of computers for detecting and recovering files of documents that have been compromised by malware. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The data storage device 106 may store files 107 of documents, such as files of Microsoft Office™ documents, portable executable format (PDF) documents, etc. As will be more apparent below, the data storage device 106 may store a protected archive (see FIG. 10, 336), which may comprise an archive file that is password protected. The computer network interface 105 may be coupled to a computer network 109, which in this example includes the Internet. For example, the computer 100 may communicate with web servers 115 on the Internet by way of the computer network interface 105. When the protected archive is stored on a remotely located data storage device 114 (e.g., in the cloud) instead of locally on the data storage device 106, the computer 100 may access the archive over the computer network 109.

Figure 1:
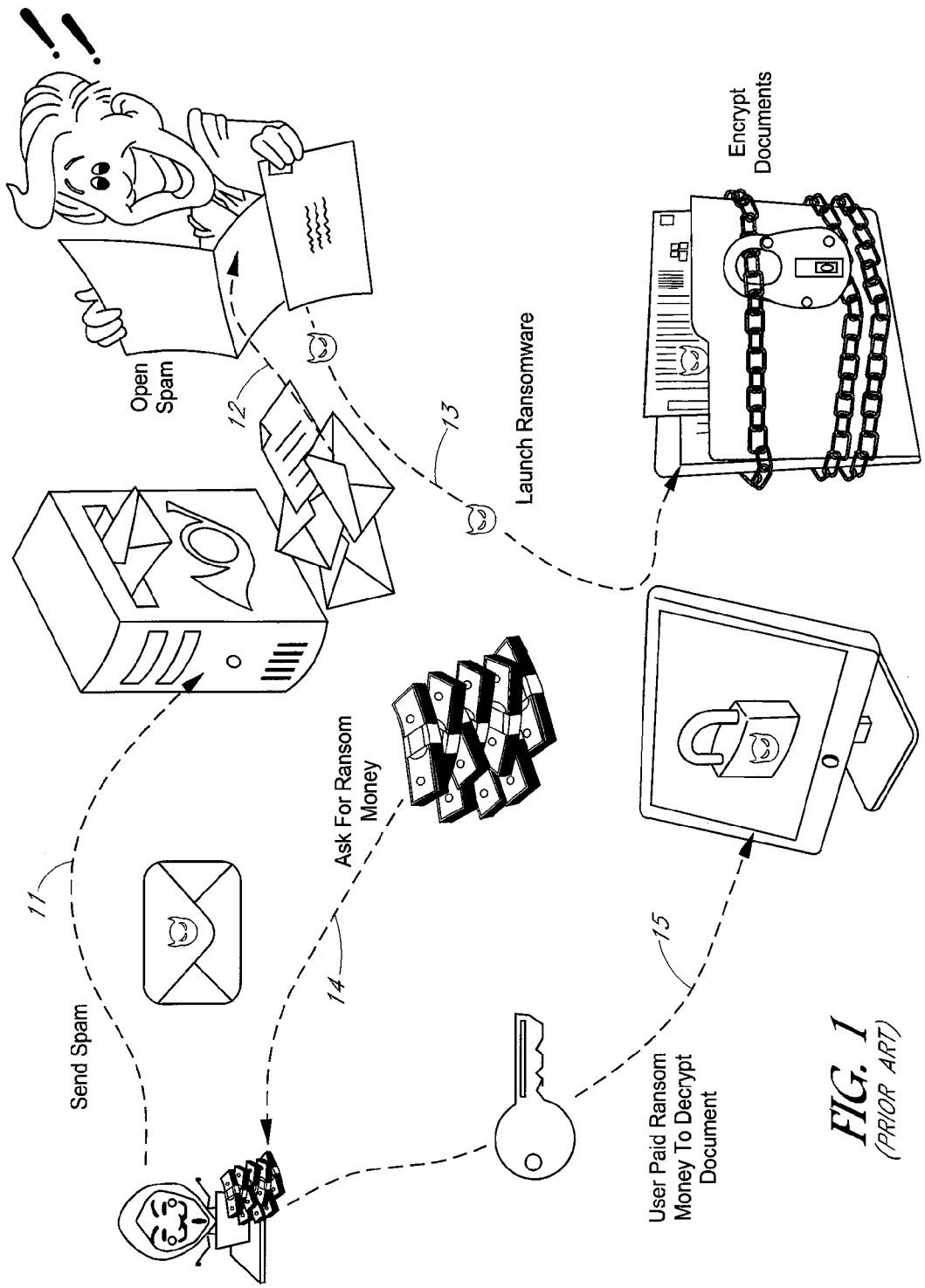
FIG. 1 schematically illustrates how a ransomware attack may be perpetrated by a cybercriminal.

The computer 100 is a particular machine as programmed with software modules, which in the example of FIG. 1 include software modules of a document protection program 116. In one embodiment, the document protection program 116 comprises a document access control module 110, a document partial hash module ("DPH module") 112, and a smart backup and recovery module ("SBR module") 113. The aforementioned software modules may comprise computer-readable program code stored non-transitory in the main memory 108 for execution by the processor 101. The computer 100 may be configured to perform its functions by executing the software modules. The software modules may be loaded from the data storage device 106 to the main memory 108. An article of manufacture may be embodied as computer-readable storage medium including instructions that when executed by a computer causes the computer to be operable to perform the functions of the software modules. As can be appreciated, the document protection program 116 may also be implemented in hardware (e.g., application specific integrated circuit, programmable logic), firmware, or a combination of hardware, software, firmware, and other components without detracting from the merits of the present invention.

Figure 3:
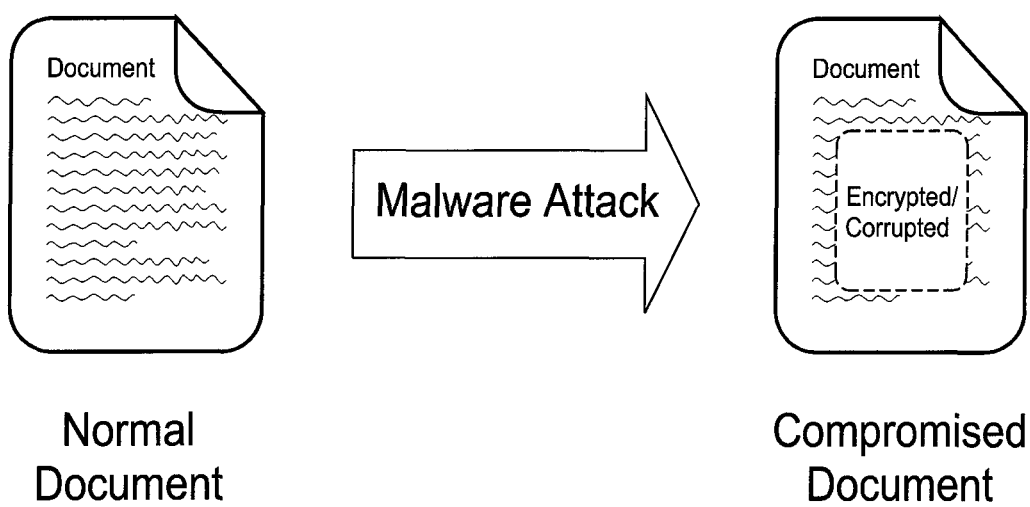
FIG. 3 schematically illustrates the effect of a malware attack on a document.

FIG. 3 schematically illustrates the effect of a malware attack on a normal document, i.e., a clean document that is not infected or accessed by the malware. The malware may compromise the document to render the document inaccessible to the user by maliciously encrypting, obfuscating, or corrupting the document, for example. As explained, recovery of the compromised document may involve paying ransom money to the cybercriminal that perpetrated the attack.

One way of recovering a compromised document is to restore a backup copy of the document. However, the inventors believe that this is not an adequate solution given that conventional backup procedures may backup the compromised document. That is, the backup copy of the normal document may be overwritten with the compromised version of the document.

Figure 4:
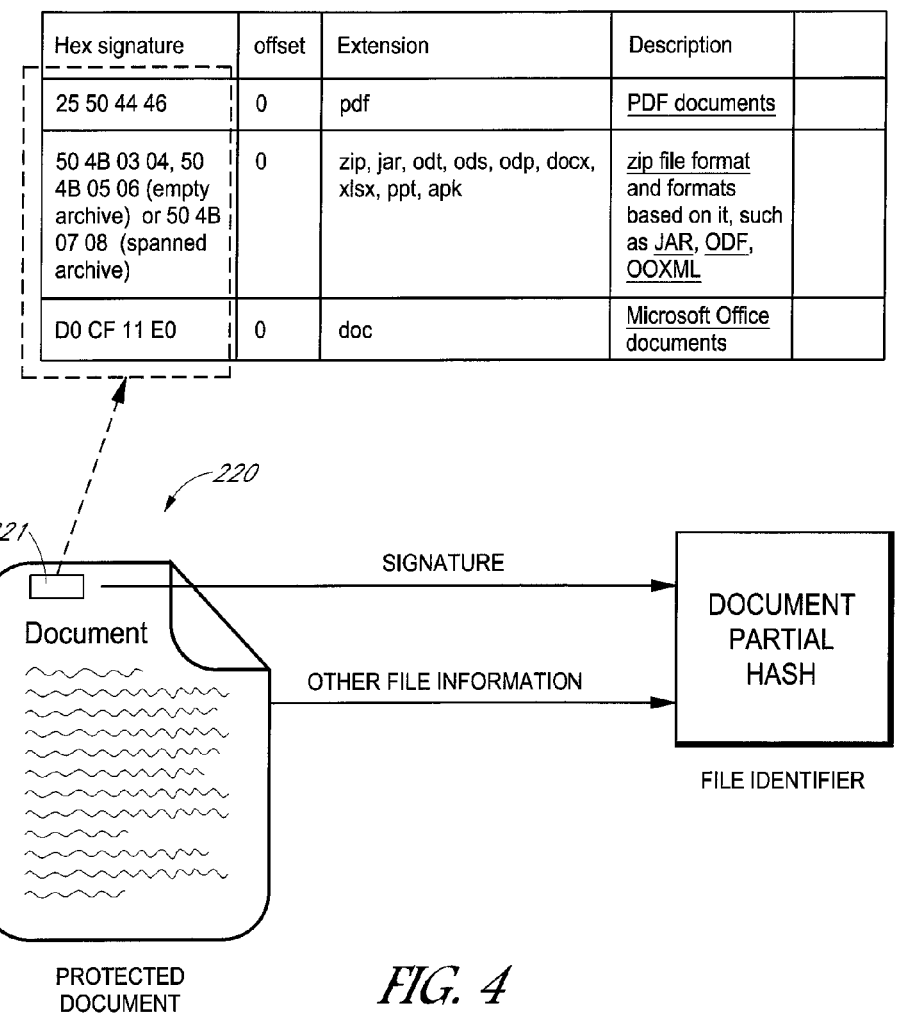
FIG. 4 schematically illustrates a protected document in accordance with an embodiment of the present invention.

FIG. 4 schematically illustrates a protected document 220 in accordance with an embodiment of the present invention. The protected document 220 may comprise a Microsoft Office™ document, a PDF document, etc. In one embodiment, the protected document 220 may be stored as a file in the data storage device 106 (see FIG. 2). For example, the data storage device 106 may store a protected Microsoft Office™ file, a protected PDF file, etc. In the present disclosure, a "protected file" refers to a file of a protected document.

In the example of FIG. 4, the file of the protected document 220, i.e., protected file, includes a file identifier in the form of a document partial hash. In one embodiment, the document partial hash comprises a signature 221 of the protected file and other file information. The signature 221 may comprise a partial hash of the protected file. That is, the signature 221 may comprise a hash of only a portion, rather than the entirety, of the content of the protected file. In one embodiment, the signature 221 is generated using the parity bit hash algorithm, e.g., on the first 2 kb (or other partial portions) of the protected file. Other algorithms for verifying the integrity of a file (e.g., use of document magic number) may also be employed without detracting from the merits of the present invention. The signature 221 may be included in the protected file, such as in a predetermined offset from the beginning of the protected file. The document partial hash may also include other file information of the protected file, such as the file header, file size, last modified time, and full pathname of the protected file. The full pathname includes the filename of the file of the protected file. The document partial hash may be included in a document partial hash list ("DPH list"), which includes the document partial hash of each protected file in the computer. As will be more apparent below, a file may be identified as a protected file by consulting the DPH list to check if the file has a full pathname that matches a full pathname in the DPH list. When a match is found, the file may be deemed to be a protected file and inspected for its expected signature 221 to determine if the file has been compromised, e.g., maliciously encrypted. A protected file may be inspected for malicious encryption before generating a backup copy of the protected file.

Figure 5:
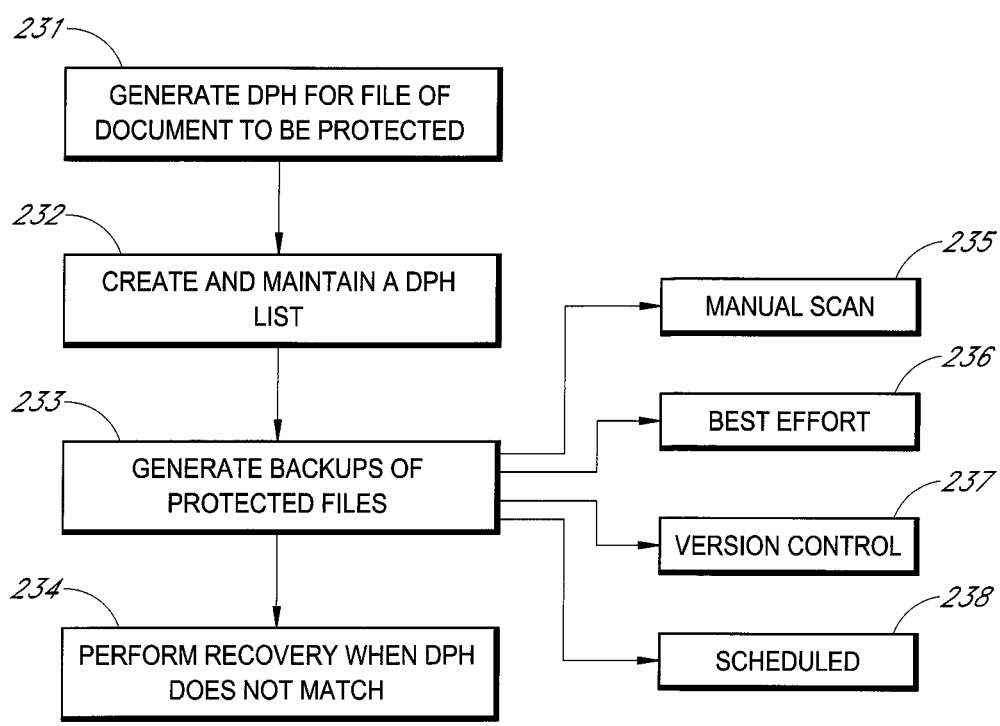
FIG. 5 shows a flow diagram of a method of detecting and recovering compromised documents in accordance with an embodiment of the present invention.

FIG. 5 shows a flow diagram of a method of detecting and recovering compromised documents in accordance with an embodiment of the present invention. The method of FIG. 5 may be performed by the computer 100 running the document protection program 116. More specifically, in the example of FIG. 5, the steps 231 and 232 may be performed by the document partial hash module ("DPH module") 112 (see FIG. 2) and the steps 233-238 may be performed by the smart backup and recovery module ("SBR module") 113 (see FIG. 2).

In the example of FIG. 5, the DPH module 112 generates a document partial hash for each file of each document to be protected (step 231). As a particular example, the document to be protected may be in PDF, archive (e.g., zip, jar, odf, etc.), Microsoft Office™, etc. file format. The DPH module 112 may generate a document partial hash that includes a signature 221, header information, file size, last modified time, and full pathname of the protected file. The DPH module 112 may include the document partial hash of each protected file in a DPH list (e.g., see FIG. 9, 337), which may be consulted to determine whether or not a file is a protected file (step 232).

As its name implies, the SBR module 113 performs smart backup and recovery of protected files, i.e., files of protected documents. The SBR module 113 may scan for and generate backup copies of protected files by manual initiation (step 235), best effort (step 236), version control (step 237), or asynchronous scheduling (step 238). These backup procedures are further explained with reference to FIGS. 11-14. As will be more apparent below, the SBR module 113 may work in conjunction with the DPH module 112 to detect whether or not a file is compromised before performing a backup of the file, thereby preventing a good backup copy of the file from being overwritten with a compromised version of the file. The SBR module 113 may perform recovery of a protected file that has been compromised by restoring the file (step 234), such as from a protected archive (e.g., see FIG. 10, 336) where the SBR module 113 stores backup copies of files of protected documents.

Figure 6:
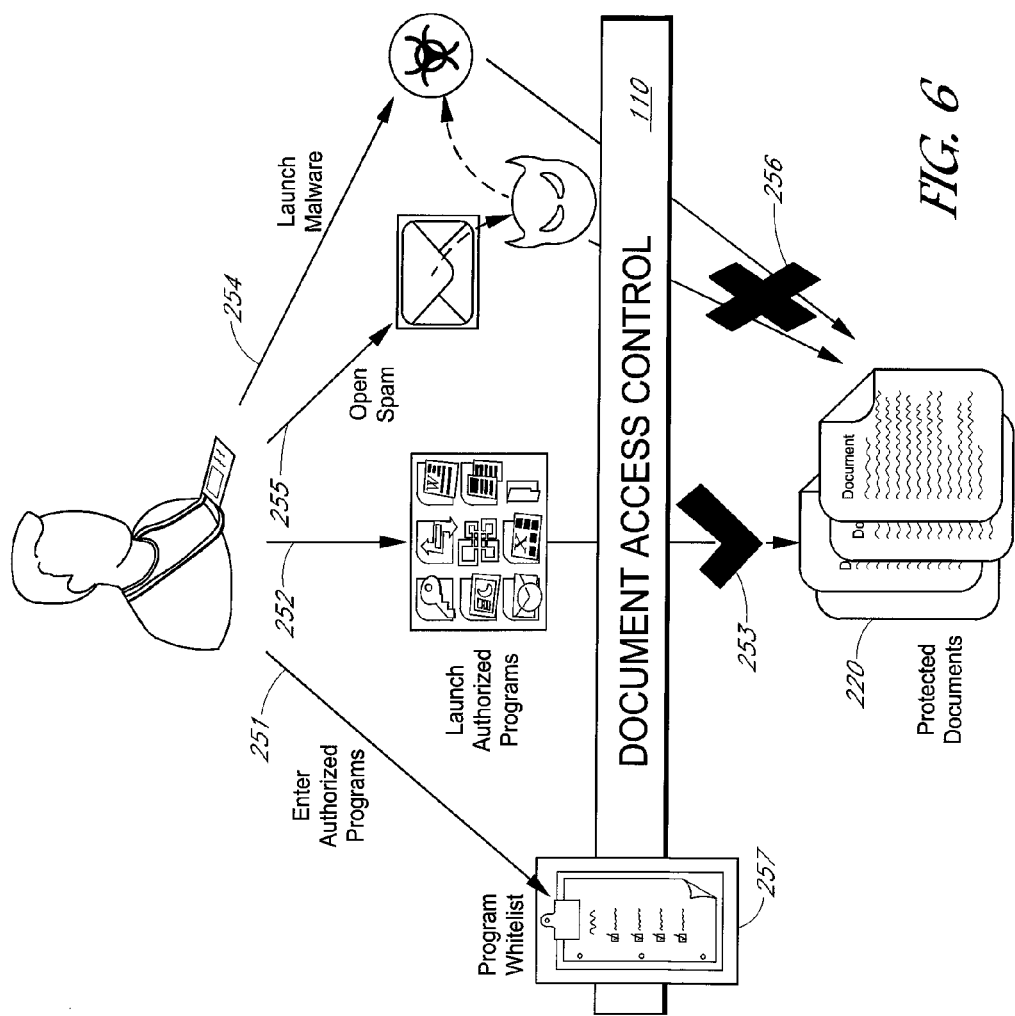
FIG. 6 schematically illustrates operation of a data access control module in accordance with an embodiment of the present invention.

In one embodiment, access to protected documents 220 is controlled by the document access control module ("DAC module") 110. FIG. 6 schematically illustrates the operation of the DAC module 110 in accordance with an embodiment of the present invention. In the example of FIG. 6, the DAC module 110 creates and maintains a program whitelist 257, which indicates computer programs that are authorized to access particular protected documents. The DAC module 110 may hook file access events, such as file operations that involve opening, reading, writing to (e.g., to change the contents), saving, deleting, and renaming files of protected documents 220. A user (or administrator) of the computer may enter the particulars (e.g., full pathname) of programs authorized to access the protected documents 220 (arrow 251) in the program whitelist 257. In the example of FIG. 6, the DAC module 110 screens access requests to protected documents 220. The DAC module 110 allows authorized programs launched by the user (arrow 252) and are included in the program whitelist 257 to access corresponding protected documents 220 ("check mark" 253). However, malware that is inadvertently launched by the user (arrow 254) or malware activated from a spam email (arrow 255) is blocked by the DAC module 110 from accessing protected documents ("crossed" 256). Malware, being not included in the program whitelist 257, is prevented from accessing protected documents 220.

Figure 7:
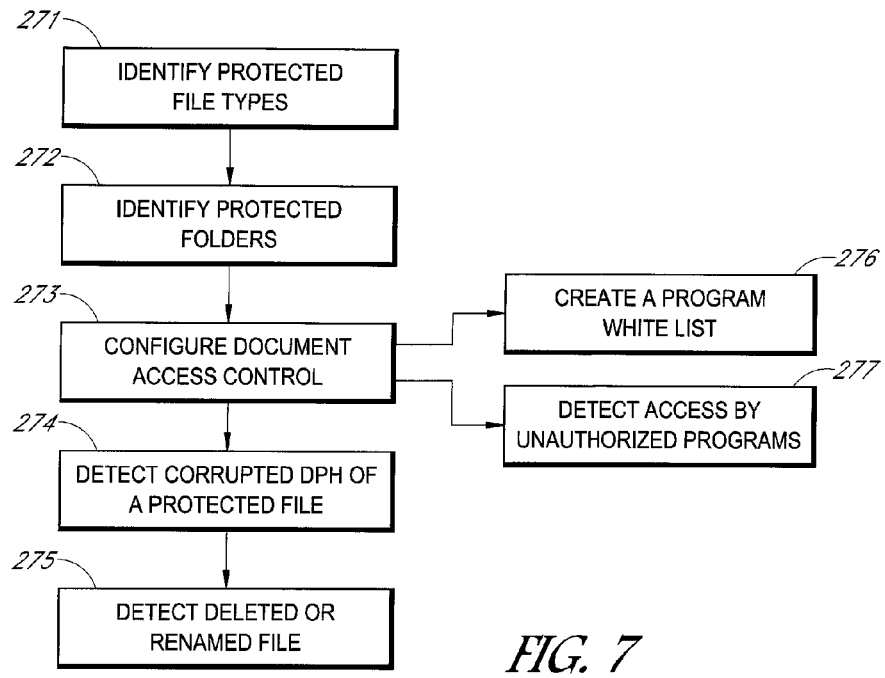
FIG. 7 shows a flow diagram of a method of detecting compromised documents in accordance with an embodiment of the present invention.

FIG. 7 shows a flow diagram of a method of detecting compromised documents in accordance with an embodiment of the present invention. The method of FIG. 7 may be performed by the computer 100 running the document protection program 116.

In the example of FIG. 7, the types of files of documents to be protected are identified (step 271). Example of types of files to be protected include PDF, Microsoft Office™, archive, etc. files. File folders (also known as "file directory") that are to be protected are also identified (step 272). The DAC module 110 may be configured to control access to a file that has a type and/or is located in a folder that have been identified for protection (step 273). In one embodiment, the DAC module 110 maintains the program whitelist 257 to indicate programs that are authorized to access the protected files and/or files stored in the protected folders (step 276). The DAC module 110 may detect and prevent access by unauthorized programs, i.e., those not indicated in the program whitelist 257, to protected files and/or files stored in protected folders (step 277). The DAC module 110 may inform the SBR module 113 of attempts by unauthorized programs to access these files. The DPH module 112 may detect corrupted or incorrect document partial hash of protected files to detect compromised documents (step 274), such as those whose files have been maliciously encrypted. For example, the DPH module 112 may compare the full pathname of a file to those in a DPH list to detect that the file is a protected file, and compare the signature of the file to that indicated in the DPH list to determine whether or not the file has been compromised by an unauthorized program. The DPH module 112 may also detect files that been deleted or renamed by unauthorized programs (step 275), based on information from the DPH list, for example.

Figure 8:
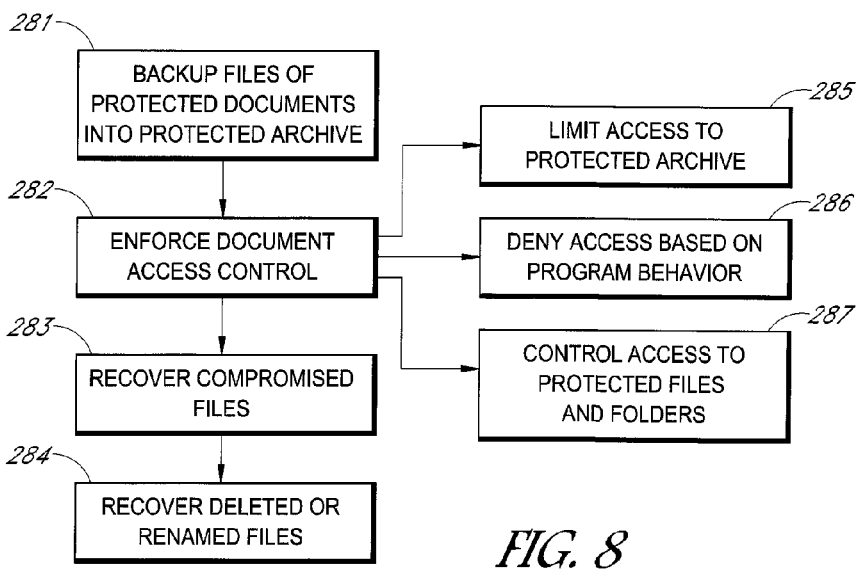
FIG. 8 shows a flow diagram of a method of recovering compromised documents in accordance with an embodiment of the present invention.

FIG. 8 shows a flow diagram of a method of recovering a compromised document in accordance with an embodiment of the present invention. The method of FIG. 8 may be performed by the computer 100 running the document protection program 116.

Figure 10:
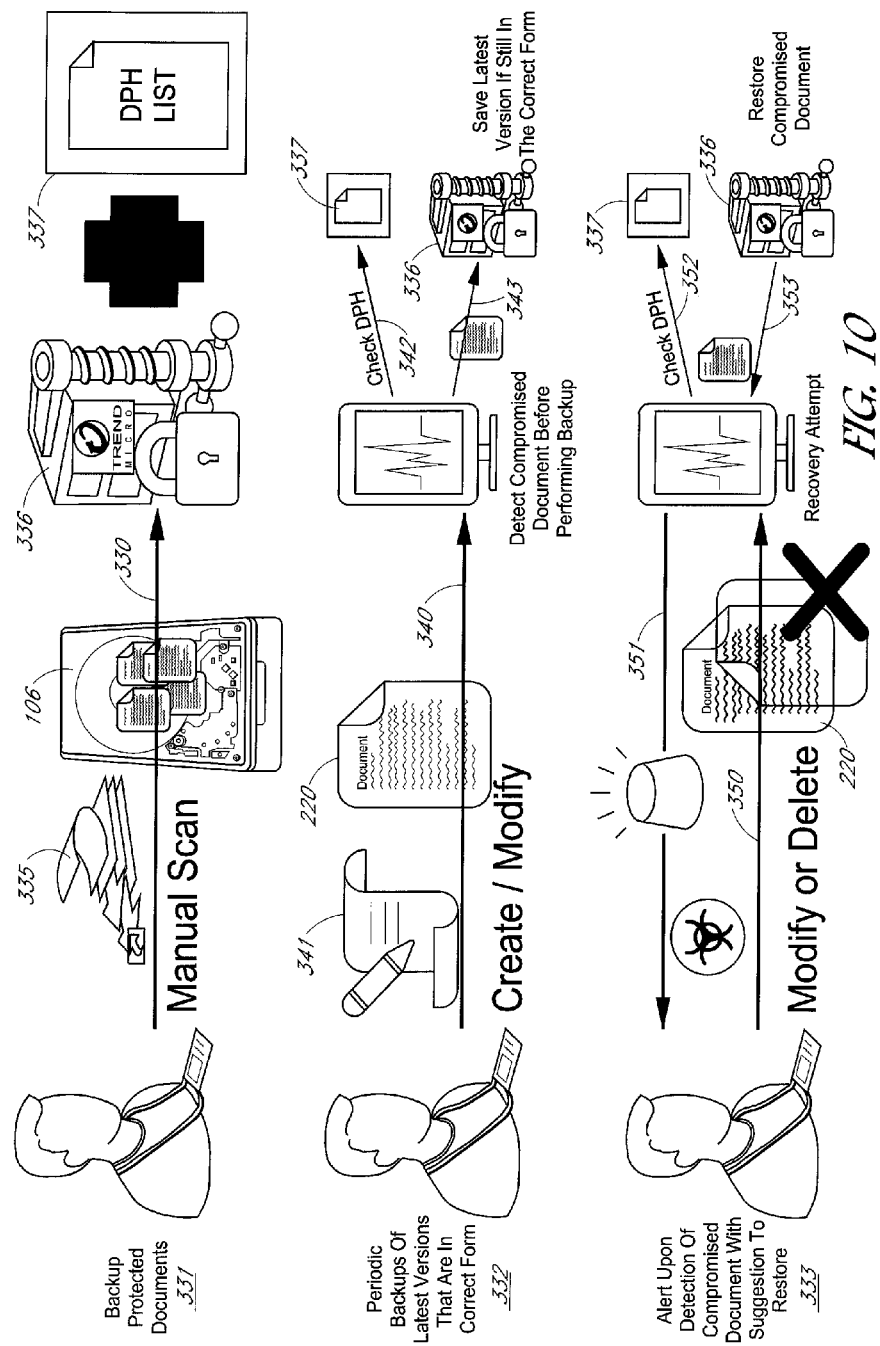
FIGS. 10-14 show flow diagrams of methods of performing smart backup and recovery procedures in accordance with embodiments of the present invention.

In the example of FIG. 8, the SBR module 113 performs a backup of files of protected documents into a protected archive (e.g., see FIG. 10, 336). The protected archive is so-named because access to it is restricted to prevent unauthorized access to files stored in the protected archive. In one embodiment, the protected archive is an encrypted archive file. The DAC module 112 enforces document access control (step 282). For example, the DAC module 112 may only allow modules of the document protection program 116 to access the protected archive (step 285), deny access to protected files based on program behavior (e.g., PDF documents can only be opened by a signed Adobe™ program or Microsoft Office™ program; all other programs will be denied access unless in the program white list) (step 286), and/or control access to protected files and folders (step 287), such as by allowing only authorized programs to access protected files and files stored in protected folders.

Figure 9:
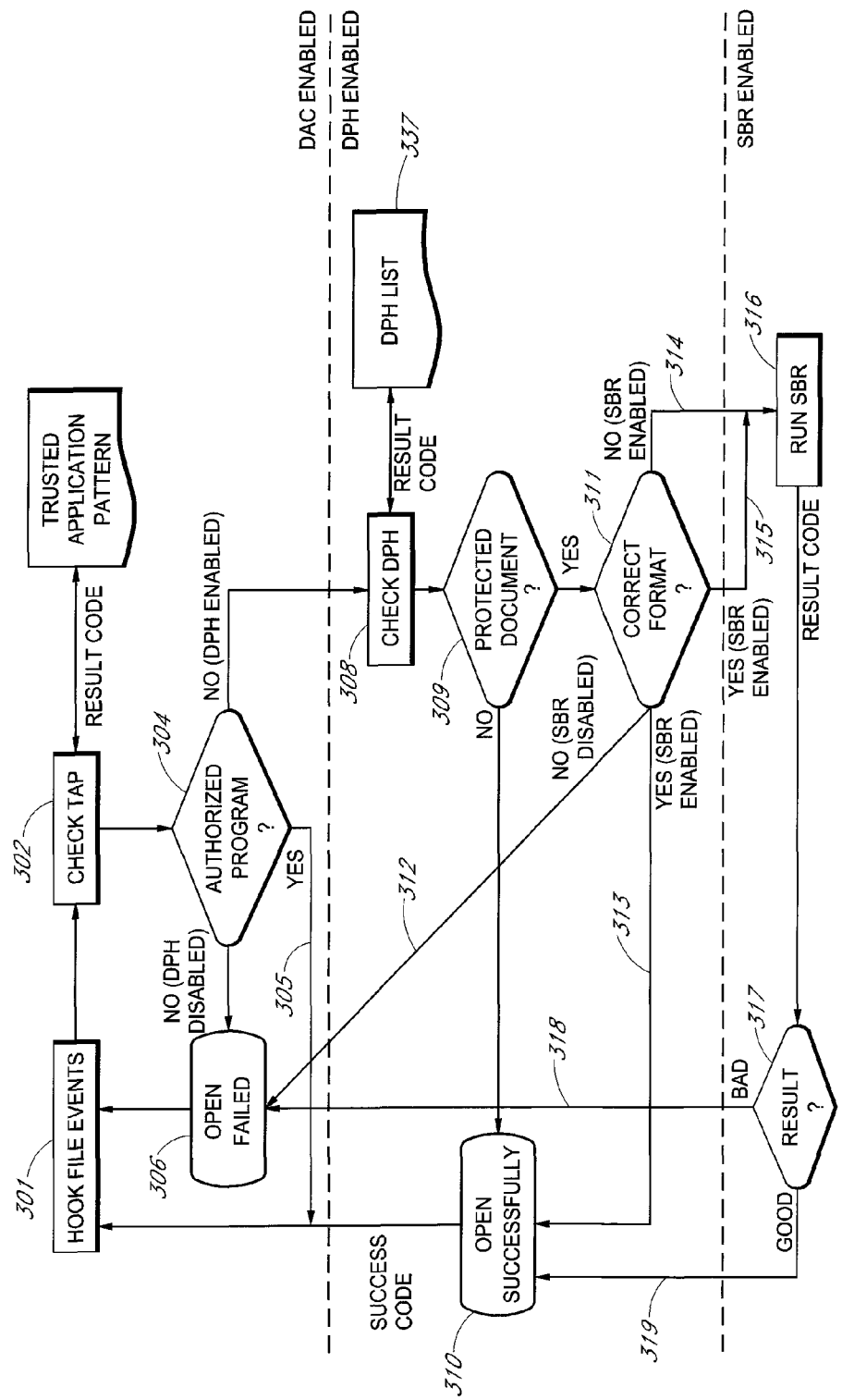
FIG. 9 shows a flow diagram of a method of performing document access control in accordance with an embodiment of the present invention.

FIG. 9 shows a flow diagram of a method of performing document access control in accordance with an embodiment of the present invention. The method of FIG. 9 may be performed by the computer 100 running the document protection program 116.

In the example of FIG. 9, the DAC module 110 monitors access to files in the computer by hooking for file access events (step 301). In one embodiment, the DAC module 110 hooks file access events that open a file with a modify bit (i.e., the file is being opened to be modified) and/or close a file with the modify bit. Upon detection of a file access event involving a target file, the DAC module 110 determines if a suspect program accessing the target file has a trusted application pattern (TAP) that matches that of an authorized program (step 302). In one embodiment, an authorized program has a trusted application pattern that includes (a) the full pathname of the executable of the authorized program, signed digital signature, and file hash (optional); (b) environment variable expanding path, filename, signed digital signature, and file hash (optional); and/or (c) short filename, signed digital signature, and file hash (optional). The trusted application pattern of an authorized program may be stored in the program whitelist, for example.

In the example of FIG. 9, the DAC module 110 determines whether or not the suspect program is an authorized program by examining the suspect program for a trusted application pattern (step 304). When the suspect program is an authorized program, i.e., the suspect program has a trusted application pattern that matches that of an authorized program, the DAC module 110 allows the suspect program to access the target file (arrow 305). When the suspect program is not an authorized program, the DAC module 110 blocks the suspect program from accessing the target file when checking for document partial hash is disabled (step 304 to step 306).

When the suspect program is not an authorized program and checking for document partial hash is enabled, the DPH module 112 checks the target file for a document partial hash (step 308). In one embodiment, the document partial hash of a protected file includes the full pathname of the file. In the example of FIG. 9, the DPH module 112 consults the DPH list 337 to determine if the full pathname of the target file matches that of a protected file. If so, the target file is deemed to be a protected file. Otherwise, when full pathname of the target file do not match that of a protected file, the target file is not deemed to be a protected file.

When the target file is not a protected file, the DPH module 112 so informs the DAC module 110, which then allows the suspect program to open the target file (step 309 to step 310). Otherwise, when the target file is a protected file, the DPH module 112 determines whether or not the target file has the correct format (step 309 to step 311).

In one embodiment, the DPH module 112 determines whether or not the target file has the correct format by looking for a valid signature. In one embodiment, the document partial hash of a protected file includes a signature 221 (see FIG. 4). When the signature 221 of the target file is valid, i.e., matches a corresponding signature 221 indicated in the DPH list 337, the target file is deemed to have a correct or proper format. When the target file does not have a valid signature 221, i.e., the signature 221 of the target file does not match the corresponding signature 221 of a protected file with the same full pathname as the target file, the target file is deemed to have an incorrect format.

A protected file with an incorrect format is most likely compromised, e.g., by encryption, obfuscation, corruption, or other ways of making the file inaccessible to the user. For example, malicious encryption of a protected file, as is the case in a ransomware attack, will change the signature 221 of the protected file. The DPH module 112 will detect this signature change when the document partial hash of the now compromised protected file is compared to the document partial hash of the protected file stored in the DPH list 337. As will be more apparent below, the compromised protected file may be restored to its pre-compromised state instead of being backed up.

When the target file has an incorrect format and smart backup and recovery is not enabled, the DPH module 112 so informs the DAC module 110, which then prevents the suspect program from accessing the target file (arrow 312). The DAC module 110 may also raise an alarm, such as by writing to a log file or sending a message (e.g., by email, text message, on-screen message) to the user regarding the compromised state of the target file.

When the target file has an incorrect format and smart backup and recovery is enabled, the DPH module 112 so informs the SBR module 113, which may attempt to recover the suspect file by restoring from a backup copy of the suspect file stored in the protected archive (arrow 314).

When the target file has the correct format and smart backup and recovery is enabled, the DPH module 112 so informs the SBR module 113, which may attempt performing a backup of the target file (arrow 315). Also, when the target file has the correct format and smart backup and recovery is enabled, the DPH module 112 may so inform the DAC module 110, which then allows the suspect program to access the target file (arrow 313).

The SBR module 113 informs the DAC module 110 of the result of the attempt to recover or backup the suspect file (step 316 to step 317). The DAC module 110 may return a success code (arrow 319) or a failure code (arrow 318) depending on whether the recovery or backup attempt is a success or failure.

FIG. 10 schematically illustrates a method of performing smart backup and recovery in accordance with an embodiment of the present invention. The method of FIG. 10 may be performed by the computer 100 running the document protection program 116.

FIG. 10 shows three stages for performing backup and recovery. In a first backup and recovery stage (top of FIG. 10), files of protected documents 220 are backed up to a protected archive 336 when the user manually initiates a scan for the files (see 331). When scanning for the protected files is manually initiated by the user, the SBR module 113 scans the data storage device 106 for files 335 that are to be protected. For example, the SBR module 113 may be configured to look for files of particular types (e.g., PDF files, Microsoft Office™ files) and files in protected folders for storage in a protected archive 336 (arrow 330). The protected archive 336 may be encrypted to control access to files stored in the protected archive 336. In one embodiment, the protected archive 336 comprises an archive file that is only accessible by modules of the document protection program 116. The DPH module 112 may generate a document partial hash for each file to be protected and store the document partial hash in the DPH list 337.

In a second backup and recovery stage (middle of FIG. 10), the SBR module 113 automatically (as opposed to user-initiated) performs periodic backups of latest versions of protected files that are in correct format (see 332). The DAC module 110 may hook to detect a file access event 341 to modify a file of a protected document 220 and backup the latest, modified version of the file if the file has not been compromised (arrow 340). For example, the DPH module 112 may consult the DPH list 337 (arrow 342) to ensure that the file is a protected file with the correct format (e.g., a valid signature) before storing the latest version of the file in the protected archive 336 (arrow 343).

In a third backup and recovery stage (bottom of FIG. 10), the user is alerted upon detection of a compromised protected document and is given the option to restore the protected document from a backup copy that is stored in the protected archive 336 (see 333). For example, malware may modify or delete a file of a protected document 220 (arrow 350). When the unauthorized modification or deletion of the file of the protected document 220 is detected, e.g., by consulting the DPH list 337 (arrow 352), the user is alerted (arrow 351), who may then choose to recover the protected document 220 by restoring from the protected archive 336 (arrow 353).

FIGS. 11-14 show flow diagrams of methods of performing smart backup and recovery procedures in accordance with embodiments of the present invention. The methods of FIGS. 11-14 may be performed by the computer 100 running the document protection program 116. For example, the DPH module 112 may be employed to generate a document partial hash for files of protected documents 220, create and maintain a DPH list 337, and consult the DPH list 337 to determine whether or not a file is that of a protected document and is in correct form.

Figure 11:
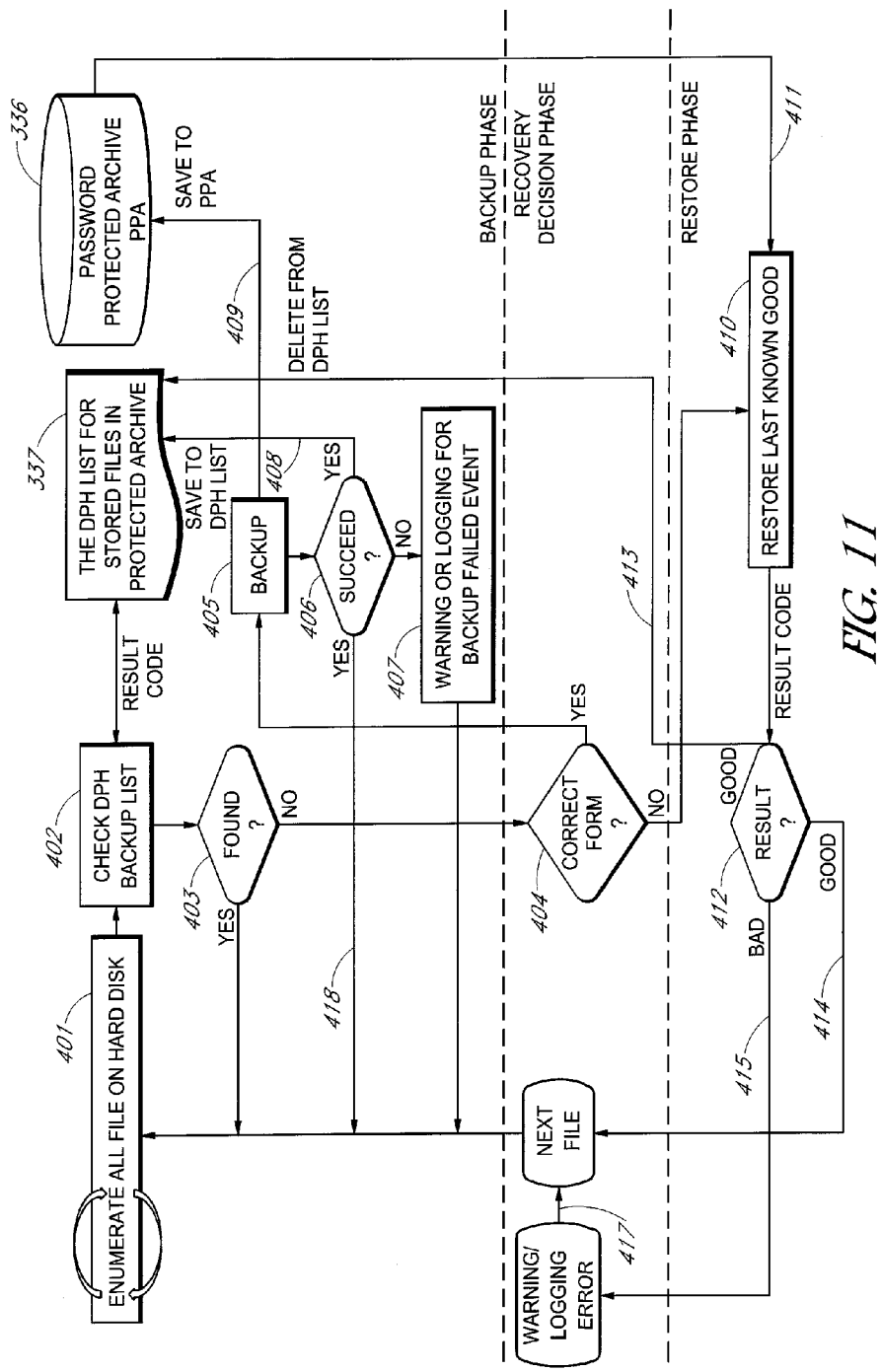

Referring first to FIG. 11, there is shown a flow diagram of a method of performing a smart backup and recovery procedure by manual scan in accordance with an embodiment of the present invention. The method of FIG. 11 is a "manual scan" in that it is manually initiated by the user to scan for protected files. When the manual scan to find protected files is initiated, the SBR module 113 enumerates or goes through the files stored on the data storage device 106 (step 401). The SBR module 113 may look for particular types of files, for example. In one embodiment, the DPH list 337 is a listing of protected files stored in the password protected archive 336, and indicates the document partial hash of each of the protected files. The SBR module 113 may determine if a file already has a valid entry in the DPH list 337 by comparing the document partial hash of the file (if any) against those of protected files indicated in the DPH list 337 (step 402). If at least the full pathname and signature of the file matches an entry in the DPH list 337, the SBR module 113 deems the file to be already backed up and recorded in the DPH list 337 and accordingly continues to go through the rest of the files stored in the data storage 106 (step 403 to step 401). Otherwise, when the file does not have a document partial hash or does not have a full pathname and signature that match an entry in the DPH list 337, the DPH module 112 determines if the file is in the correct format (step 403 to step 404).

When the file has the correct format (e.g., readable, not encrypted), the DPH module 112 so informs the SBR module 113 (step 404 to step 405), which then generates a backup copy of the file for storage in the protected archive 336 (arrow 409). When the backup procedure is successful, the SBR module 113 continues to scan for the rest of the files in the data storage device 106 (arrow 418), and the DPH module 112 generates a document partial hash of the file for storage in the DPH list 337 (arrow 408). The SBR module 113 alerts the user when the backup procedure is not successful (step 406 to step 407).

When the file has an incorrect format (e.g., unreadable, encrypted), the DPH module 112 so informs the SBR module 113 (step 404 to step 410), which then attempts to recover the file by restoring from the protected archive 336 (arrow 411). This is the case when, for example, the file has a full pathname that matches that of a protected document indicated in the DPH list 337 but does not have a valid signature or other document partial hash information because of malicious encryption, for example. The SBR module 113 alerts the user when the recovery procedure is not successful (arrow 415). When the file recovery is successful, the DBH module 112 deletes all information for the recovered file in the DPH list 337 (arrow 413). In any event, the SBR module 113 continues to scan for other files in the data storage device 106 (arrow 414; arrow 417).

Figure 12:
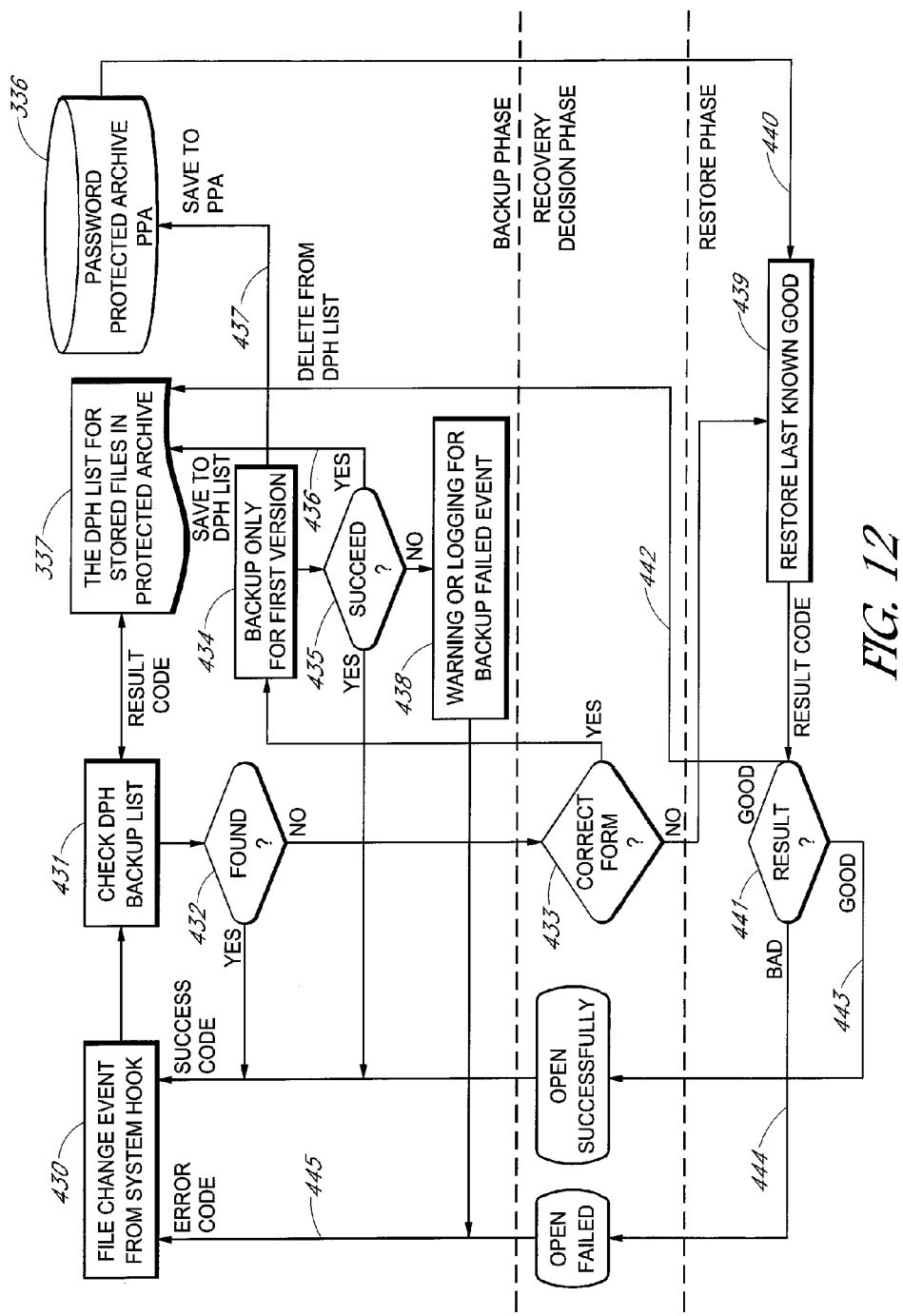

FIG. 12 shows a flow diagram of a method of performing a smart backup and recovery procedure by best effort in accordance with an embodiment of the present invention. The method of FIG. 12 is so named because, as will be more apparent below, it is employed to generate a backup copy of only the first version of the protected file. This minimizes the number of backup procedures performed, which may be advantageous in some computing environments.

In the example of FIG. 12, the SBR module 113 detects file access events that involve creation of a new file or modification of an existing file (step 430). The SBR module 113 may get a notification of such file access events from a system hook, including from the DAC module 110 or the operating system, for example. Upon detection of a file access event to create a new file or modify an existing file, the SBR module 113 checks the DPH list 337 to determine if the file already has a valid entry in the DPH list 337. For example, the SBR module 113 may compare the document partial hash of the file (if any) against the document partial hash of protected files indicated in the DPH list 337 (step 431). If at least the full pathname and signature of the file matches an entry in the DPH list 337, the SBR module 113 deems the file to already have a backup copy in the protected archive 336 and, accordingly continues to detect for file access events (step 432 to step 430). Otherwise, when the file does not have a document partial hash or does not have a full pathname and signature that match an entry in the DPH list 337, the DPH module 112 determines if the file is in the correct format (step 432 to step 433).

When the file has the correct format, (e.g., readable, not encrypted), the DPH module 112 so informs the SBR module 113 (step 433 to step 434), which then generates a backup copy of the file only for the first version of the file for storage in the protected archive 336 (arrow 437). When the backup procedure is successful, the SBR module 113 continues to detect for file access events (step 435 to step 430); the DPH module 112 generates a document partial hash of the file for storage in the DPH list 337 when the file is the first version of the file (arrow 436). Otherwise, the SBR module 113 raises an alarm when the backup procedure is not successful (step 435 to step 438).

When the file has an incorrect format (e.g., unreadable, encrypted), the DPH module 112 so informs the SBR module 113 (step 433 to step 439), which then attempts to recover the file by restoring from the protected archive 336 (arrow 440). The SBR module 113 raises an alarm or returns an error message when the recovery procedure is not successful (arrow 444). When the file recovery is successful, the DBH module 112 deletes all information for the recovered file in the DPH list 337 (arrow 442). In any event, the SBR module 113 continues to detect for file access events (arrow 443, arrow 445).

Figure 13:
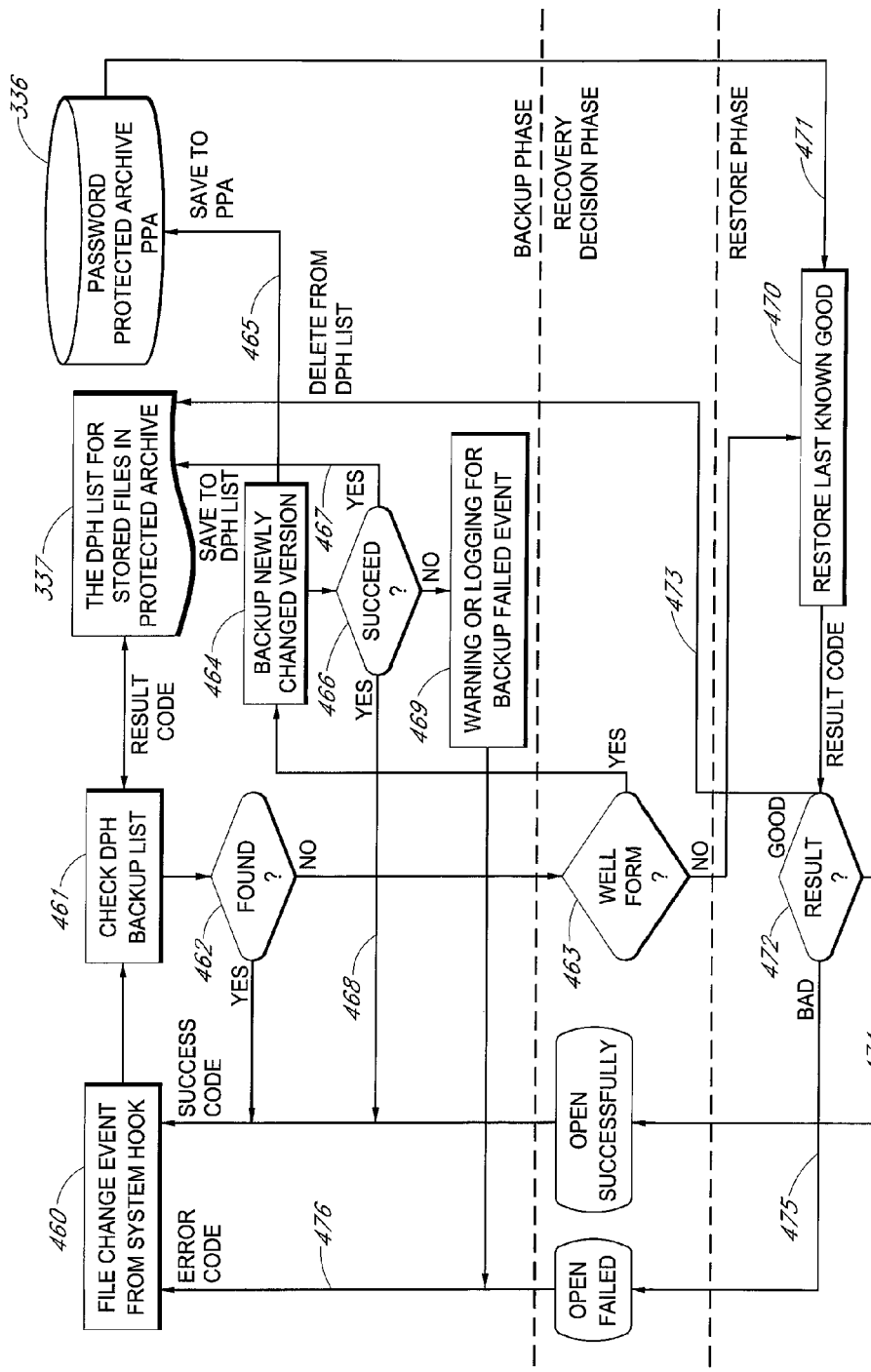

FIG. 13 shows a flow diagram of a method of performing a smart backup and recovery procedure by version control in accordance with an embodiment of the present invention. The method of FIG. 13 is so named because, as will be more apparent below, it is employed to generate a backup copy of the latest version of the protected file. This may involve performing more backup procedures compared to best effort, but advantageously allows a file to be restored from its latest version.

In the example of FIG. 13, the SBR module 113 detects file access events that involve creation of a new file or modification of an existing file (step 460). Upon detection of a file access event to create a new file or modify an existing file, the SBR module 113 checks the DPH list 337 to determine if the file already has a valid entry in the DPH list 337. For example, the SBR module 113 may compare the document partial hash of the file (if any) against the document partial hash of protected files indicated in the DPH list 337 (step 461). If at least the full pathname and signature of the file matches an entry in the DPH list 337, the SBR module 113 deems the file to already have a backup copy in the protected archive 336 and, accordingly continues to detect for file access events (step 462 to step 460). Otherwise, when the file does not have a document partial hash or does not have a full pathname and signature that match an entry in the DPH list 337, the DPH module 112 determines if the file has the correct format (step 462 to step 463).

When the file has the correct format, (e.g., readable, not encrypted), the DPH module 112 so informs the SBR module 113 (step 463 to step 464), which then generates a backup copy of the latest version of the file for storage in the protected archive 336 (arrow 465). For example, to determine the latest version, the SBR module 113 may compare the last modified time of the versions of the file. When the backup procedure is successful, the SBR module 113 continues to detect for file access events (step 466 to step 460); the DPH module 112 generates a new document partial hash of the file for storage in the DPH list 337 when the file is the latest version (arrow 467). Otherwise, the SBR module 113 raises an alarm when the backup procedure is not successful (step 466 to step 469).

When the file has an incorrect format (e.g., unreadable, encrypted), the DPH module 112 so informs the SBR module 113 (step 463 to step 470), which then attempts to recover the file by restoring from the protected archive 336 (arrow 471). The SBR module 113 raises an alarm or returns an error message when the recovery procedure is not successful (arrow 475). When the file recovery is successful, the DBH module 112 deletes all information for the recovered file in the DPH list 337 (arrow 473). In any event, the SBR module 113 continues to detect for file access events (arrow 474, 476).

Figure 14:
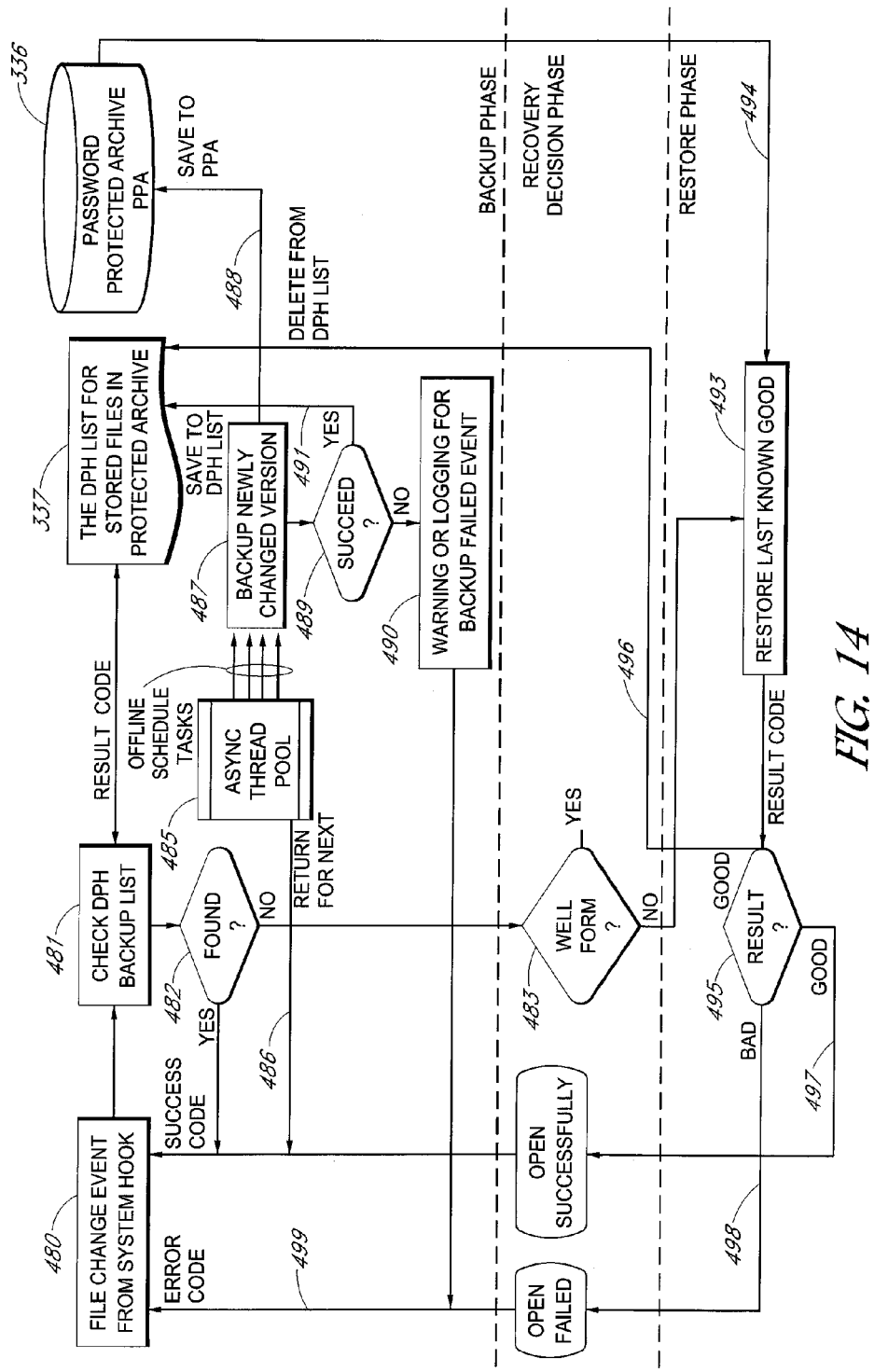

FIG. 14 shows a flow diagram of a method of performing a smart backup and recovery procedure by asynchronous scheduling in accordance with an embodiment of the present invention. The method of FIG. 14 is so named because, as will be more apparent below, it is employed to generate a backup copy of the newly changed version of the protected file by scheduling. For example, when a newly changed version of a file is detected, the procedure to generate a backup copy of the file may be scheduled and completed asynchronously.

In the example of FIG. 14, the SBR module 113 detects file access events that involve creation of a new file or modification of an existing file (step 480). Upon detection of a file access event to create a new file or modify an existing file, the SBR module 113 checks the DPH list 337 to determine if the file already has a valid entry in the DPH list 337. For example, the SBR module 113 may compare the document partial hash of the file (if any) against the document partial hash of protected files indicated in the DPH list 337 (step 481). If at least the full pathname and signature of the file matches an entry in the DPH list 337, the SBR module 113 deems the file to already have a backup copy in the protected archive 336 and, accordingly continues to detect for file access events (step 482 to step 480). Otherwise, when the file does not have a document partial hash or does not have a full pathname and signature that match an entry in the DPH list 337, the DPH module 112 determines if the file has the correct format (step 482 to step 483).

When the file has the correct format, (e.g., readable, not encrypted), the DPH module 112 so informs the SBR module 113 (step 483 to step 485), which then schedules the procedure to generate a backup copy of the latest version of the file (step 485 to step 487) for storage in the protected archive 336 (arrow 488). The SBR module 113 may compare the last modified time of the versions of the file to determine the latest version. The SBR module 113 may perform each scheduled backup procedure asynchronously, off-line. The SBR module 113 may return a message or code indicating that the backup procedure for the file has been scheduled (arrow 486). When the backup procedure is successful, the DPH module 112 generates a new document partial hash of the file for storage in the DPH list 337 when the file is the latest version (arrow 491). Otherwise, the SBR module 113 raises an alarm when the backup procedure is not successful (step 490 to step 480).

When the file has an incorrect format (e.g., unreadable, encrypted), the DPH module 112 so informs the SBR module 113 (step 483 to step 493), which then attempts to recover the file by restoring from the protected archive 336 (arrow 494). The SBR module 113 raises an alarm or returns an error message when the recovery procedure is not successful (arrow 498). When the file recovery is successful, the DBH module 112 deletes all information for the recovered file in the DPH list 337 (arrow 496). In any event, the SBR module 113 continues to detect for file access events (arrow 497, arrow 499).

Methods and systems for detecting and recovering documents that have been compromised by malware have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method performed by a computer comprising a hardware processor and a memory, the memory comprising instructions that are executed by the hardware processor to perform the method, the method comprising:
   generating a hash of a file;
   generating an identifier of the file, the identifier including a signature that is embedded in the file and a pathname of the file as stored in a data storage device, the signature including the hash of the file;
   maintaining a listing that includes the identifier of the file;
   before generating a backup copy of the file, determining whether or not the file is stored in the data storage device with a same pathname as indicated in the listing;
   before generating the backup copy of the file and in response to detecting that the file is stored in the data storage device with the same pathname as indicated in the listing, inspecting the file for the signature;
   in response to finding the signature in the file, generating a backup copy of the file;
   after generating the backup copy of the file, detecting that the file has been encrypted by ransomware; and
   in response to detecting that the file has been encrypted by ransomware, restoring the file from the backup copy of the file by replacing the file with the backup copy of the file.

2. The computer-implemented method of claim 1, further comprising:
   limiting access to the file only to programs included in a whitelist of authorized programs.

3. The computer-implemented method of claim 1, further comprising:
   storing the backup copy of the file in a protected archive.

4. The computer-implemented method of claim 3, wherein the protected archive is an encrypted archive file.

5. The computer-implemented method of claim 3, wherein the identifier includes information on a last time the file has been modified.

6. The computer-implemented method of claim 1, further comprising:
   scanning the data storage device for other files that do not have a corresponding entry in the listing;
   generating backup copies of the other files; and
   storing the backup copies of the other files in a protected archive.

7. The computer-implemented method of claim 1, wherein the backup copy of the file is generated only for a first version of the file.

8. The computer-implemented method of claim 1, wherein a procedure to generate the backup copy of the file is a scheduled task.

9. A system comprising:
   a computer comprising a hardware processor and a memory, the memory storing instructions that when executed by the hardware processor causes the computer to generate a hash of a file, generate an identifier of the file that includes a signature that is embedded in the file and a pathname of the file as stored in a data storage device, maintain a listing that includes the identifier of the file, consult the listing to detect that the file has an entry in the listing based on the pathname of the file, inspect the file for the signature, generate a backup copy of the file in response to detecting that the file has the entry in the listing and in response to finding the signature in the file, detect that the file has been encrypted by ransomware, and restore the file from the backup copy of the file in response to detecting that the file has been encrypted by ransomware by overwriting the file with the backup copy; and
   the data storage device that is configured to store an archive that includes the backup copy of the file.

10. The system of claim 9, wherein the computer limits access to the file only to programs included in a whitelist of authorized programs.

11. The system of claim 9, wherein the archive is an encrypted archive file.

12. The system of claim 9, wherein the computer scans the data storage device for other files that do not have a corresponding entry in the listing, generates backup copies of the other files, and stores the backup copies of the other files in the archive.

* * * * *